No. 710,848. Patented Oct. 7, 1902.
O. E. DAVIDSON.
CORN SHELLER.
(Application filed Jan. 4, 1902.)
(No Model.) 2 Sheets—Sheet 1.

Witnesses
Inventor:
Oliz E. Davidson

No. 710,848. Patented Oct. 7, 1902.
O. E. DAVIDSON.
CORN SHELLER.
(Application filed Jan. 4, 1902.)
(No Model.) 2 Sheets—Sheet 2.

Witnesses: Inventor
Otis E. Davidson
his Attys

UNITED STATES PATENT OFFICE.

OTIS E. DAVIDSON, OF NASHVILLE, TENNESSEE, ASSIGNOR TO J. B. KNOTT AND CUMBERLAND FOUNDRY & MANUFACTURING COMPANY, OF NASHVILLE, TENNESSEE, A CORPORATION OF TENNESSEE.

CORN-SHELLER.

SPECIFICATION forming part of Letters Patent No. 710,848, dated October 7, 1902.

Application filed January 4, 1902. Serial No. 88,452. (No model.)

*To all whom it may concern:*

Be it known that I, OTIS E. DAVIDSON, of Nashville, in the county of Davidson, State of Tennessee, have invented certain new and useful Improvements in Corn-Shellers; and I do hereby declare the following to be a full, clear, and exact description of the same, reference being had to the accompanying drawings, forming a part of this specification, and to the letters of reference marked thereon.

This invention relates to improvements in machines for shelling corn from the cob, the objects of the invention being to provide a simple, easily-operated, and efficient mechanism for accomplishing the desired end, which mechanism shall be capable of being mounted in and combined with a box or casing of such form and size that it may be supported on any suitable table or stand.

Further objects of the invention are to provide a sheller with which the corn, silk, and chaff from the cob and the cob itself may be all separated and discharged through separate channels, if so desired, or the corn may be discharged separate from the chaff and cob, and with which mechanism the corn may be "nubbed" and short or nubbin corn effectually shelled.

The invention consists in certain novel details of construction and combinations and arrangements of parts, all as will be now described, and pointed out particularly in the appended claims.

Figure 1:
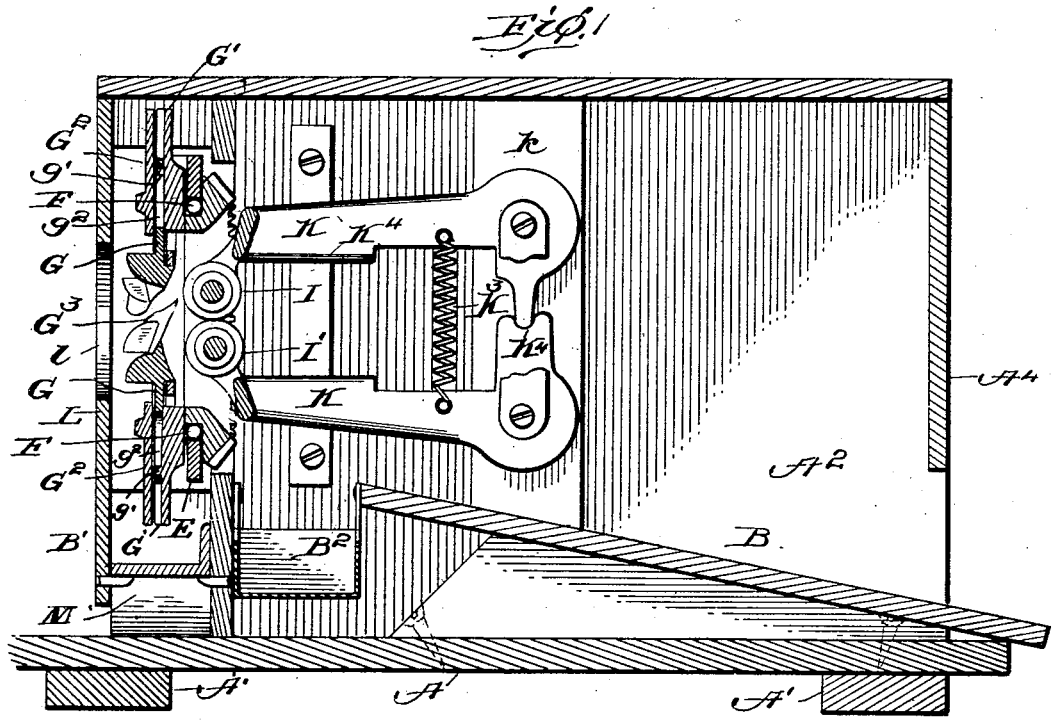
Figure 2:
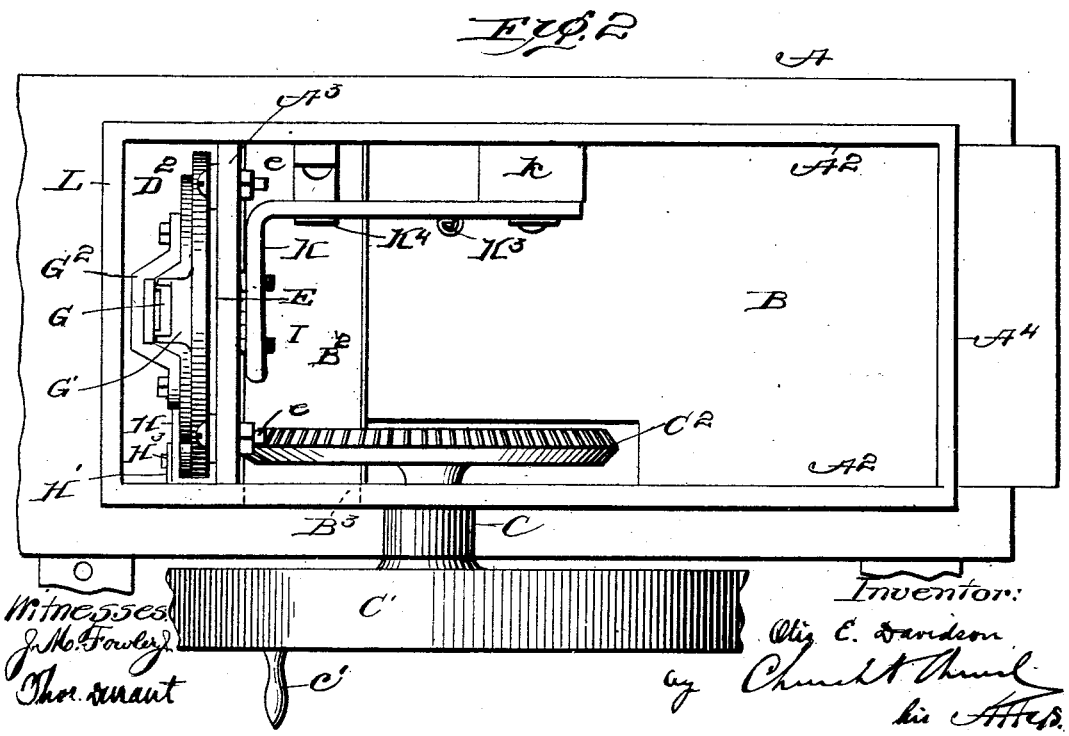
Figure 3:
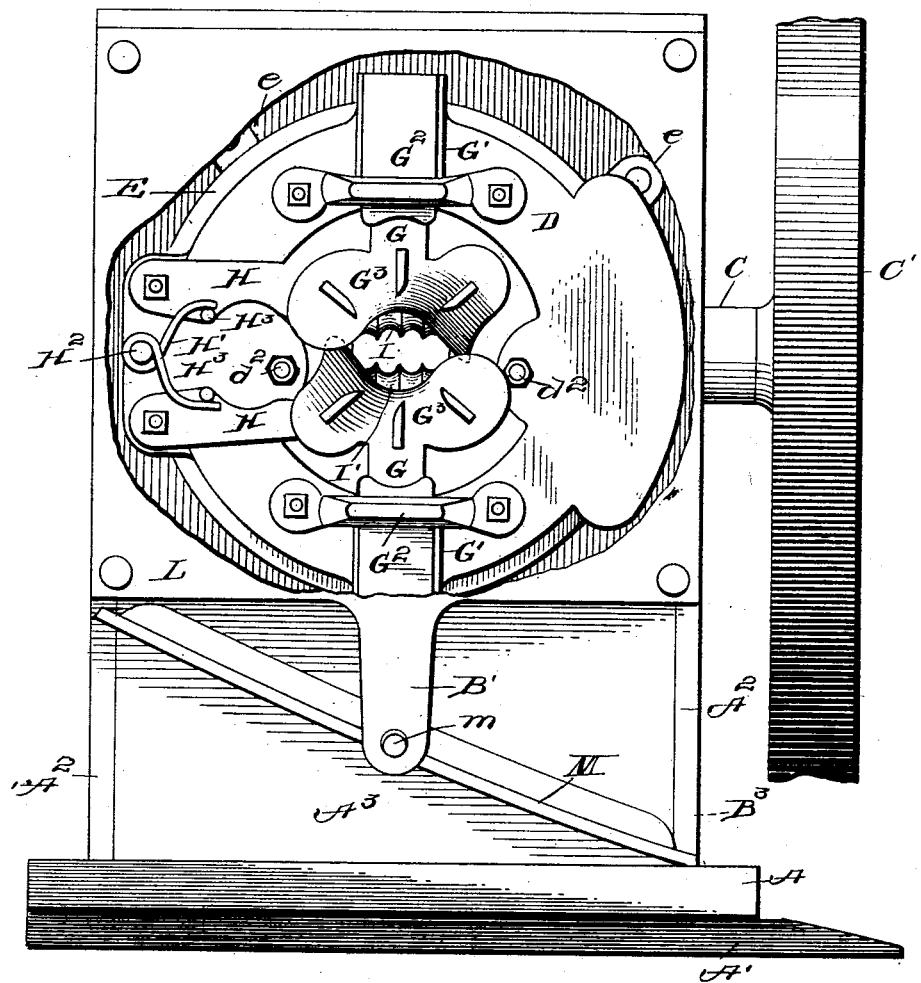
Figure 4:
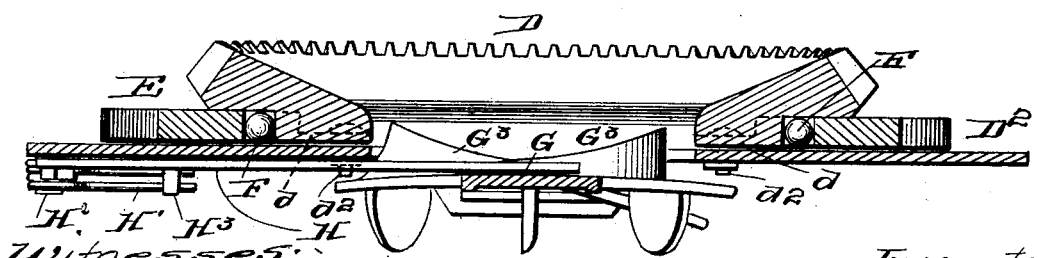

Referring to the accompanying drawings, Figure 1 is a central longitudinal section through a sheller embodying the present improvements. Fig. 2 is a top plan view with the cover removed. Fig. 3 is a front elevation with the upper portion of the front plate broken away to show the shelling teeth or blades and the feed-flanges. Fig. 4 is a detail section through the shelling-wheel and its ring-support, this view also illustrating one of the spring-pressed arms for advancing the shelling-teeth and feed-flanges in the shelling-wheel.

Like letters of reference in the several figures indicate the same parts.

The box or casing in which the operating mechanism of the sheller are mounted and which form a protective casing to prevent the corncob and chaff from flying about in all directions is preferably composed of a base-board A, having suitable cleats A' on the bottom projecting at one side for the application of screws or bolts, whereby the sheller may be fastened down to a suitable table, bench, or other support. Extending up from the base-board A are side boards $A^2$, and between the side boards are front and rear end boards $A^3$ $A^4$, the latter boards being held in position by being slipped into grooves in the side boards or by being fastened by screws, bolts, or other devices, as will be readily understood. The front board $A^3$ is provided with a circular aperture in which is fitted the shelling-wheel, to be hereinafter described, and from a point in proximity to this front board $A^3$ an incline or chute B passes down and through the rear end board, so as to form a guide for the cobs, &c., passing through the shelling-wheel. This incline B may be supported by a central wedge-shaped projection B' on the base-board, and near its forward end there may be located a transverse chute $B^2$, preferably relatively narrow and inclining down toward one side of the casing, where it discharges through a small side opening $B^3$, said chute being adapted to discharge the silk, chaff, and other fine waste material cut from the cob by the shelling mechanism or broken off with the grains of corn. In one side of the casing, preferably in the right-hand side looking at the front end of the casing, is journaled a drive-shaft C, said drive-shaft being adapted to carry on the outer side of the casing a drive-wheel C', to which a suitable handle $c'$ may be attached, and on the inner side of the casing a beveled gear-wheel $C^2$, adapted to mesh with the shelling-wheel D, located in the circular opening in the front board of the casing, as aforesaid. The shelling-wheel consists generally of a gear-wheel or toothed ring, (lettered D,) which toothed ring is provided with a forwardly-extending flange $d$, to the front end of which is adapted to be secured a support or sheller-plate $D^2$. The bolts or screws $d^2$, passing through lugs on the wheel and plate, clamp the two together, forming between them a channel for the reception of a bearing-ring E, which bearing-ring E is mounted on or supported by the front end board of the casing, the connections being preferably formed by bolts $e$, passing through suitable lugs on the bearing-ring and through the front board, respectively. With such a construction the sheller-wheel, together with its front plate, is adapted to rotate in the bearing-ring, and in order to reduce as far as possible the friction which would otherwise be caused by so large a bearing-surface antifriction rollers or balls F are introduced between the moving parts, as shown clearly in Figs. 1 and 4.

The front plate of the sheller-wheel is adapted to carry the shelling mechanism proper, which mechanism consists of a pair of jaws movable in right lines toward and from each other and guided by having their shanks G mounted in guides $G'$ on the sheller-plate and preferably inclosed by removable brackets $G^2$, whereby the stems of the jaws are protected and given an extended bearing-surface to prevent lateral displacement. The range of movement of said jaws is limited and determined by lugs $g'$, formed on the brackets or guides and projecting into slots $g^2$ in the stems of the jaws, as also illustrated in said Fig. 1. Each of the jaws consists of a spiral $G^3$, preferably sharpened sufficiently to enter or cut into the cob, and thereby feed or advance the same endwise when the sheller-wheel is rotated and the cob held against rotation, and a series of shelling flanges or lips projecting from the face of said spirals and in position to contact with and strip the corn from the cob as the latter is fed in between the jaws.

In order to hold the jaws together with an equal pressure, thereby insuring a uniform action of the shelling-head, arms H are pivotally mounted on the front plate of the sheller-wheel and at their inner ends bear upon the outer sides of the spirals of the sheller-jaws, and said arms H are advanced toward each other by a spring $H'$, preferably coiled about an intermediate stud $H^2$ and having its ends projected on the outer sides of lugs $H^3$ on the said arms. With this construction the spring exerts an equal pressure on the two arms and through said arms on the sheller-jaws, advancing said jaws uniformly and with an equal pressure.

To insure successful operation of the machine, it is of course essential that the cob, together with the shelled portion of the corn thereon, should be held against rotation with the shelling-wheel, and in order to accomplish this result immediately back of said shelling-wheel there is mounted a pair of holding-rollers I $I'$, preferably provided with circumferential flanges or ribs and adapted to engage the end of the cob projecting through the shelling-wheel and to prevent the rotation of the same as the cob advances. Said holding-rollers are in the present instance mounted in the forward ends of angle-arms K, which arms K are journaled on the side of the box or casing or on a suitable bracket $k$, as shown in Fig. 2, and are advanced toward each other by a spring $K^3$, Fig. 1. It is highly desirable that the arms should advance uniformly and always to a central point, for which purpose they are preferably connected by toothed projections $K^4$, extending between them in proximity to the pivots and forming, as it were, segments of gear-wheels. Thus said arms are forced to move simultaneously, but in opposite directions. Stops for limiting the movements of the arms toward each other may be mounted on the side of the casing, as shown at $K^4$, or the holding-rollers may be allowed to contact, especially if they are formed with a centrally-reduced diameter, so as to permit a cob to enter between them readily as it passes through the shelling-wheels.

The corn stripped from the cob by the shelling teeth or lips falls down in front of the shelling-wheel, and in order to prevent it from flying about in all directions a face-plate L is mounted on the front end of the casing and provided with a central aperture $l$ of sufficient diameter to permit of the passage of gears of the largest size, but at the same time sufficiently small to prevent the escape or flying of corn through the same when an ear is being shelled. The corn dropping down between the face-plate and front board of the casing is caught by the chute M, preferably centrally pivoted at $m$ in a downward projection of the face-plate and lower portion of the front board, whereby it is adapted to discharge the corn on either side of the sheller and into a suitable receptacle placed for its reception.

In operation, assuming that one person is to turn the driving-wheel and also feed the corn, the drive-wheel is turned with the right hand, an ear of corn taken in the left hand and its smaller end presented to the shelling teeth or lips, so as to strip the nubbin corn therefrom, the ear being then pressed forward until the feeding-spirals take into the cob, when the operator has then simply to prevent the rotation of the ear until the holding-rollers take effect on the cob, when the subsequent advancing and shelling of the corn will proceed automatically as long as the shelling-wheel is rotated and the operator's left hand is left free to select another ear for presentation to the sheller as soon as the former ear has passed through the shelling-wheel.

In practice it is found that there is an effectual separation of the corn from the cob, silk, and chaff, the latter falling down on the inner side of the shelling-wheel, while the corn is discharged on the outer side of said wheel and between the wheel and face-plate. Thus the corn may be delivered into one receptacle, the chaff and silk in another, while the cobs are discharged from the rear end of the machine into still a third receptacle, although it will be understood that the chaff, &c., may be allowed to pass down with the cobs, in which instance the middle chute will not be necessary.

By reason of the fact that the shelling-lips or flanges operate against the ends of the grains of corn it is found that the corn is stripped from the cob much more easily than would be the case if they operated against the flat sides of the grains, and by reason of this fact and by eliminating the friction on the large bearing-surface of the shelling-wheel it is found that the sheller is an easy, light-running, and rapid device.

Having thus described my invention, what I claim as new, and desire to secure by Letters Patent, is—

1. In a corn-sheller, the combination with the shelling-wheel having beveled gear-teeth on one side and a projecting flange on the opposite side, of a front plate secured to said flange, radially-movable shelling-jaws carried by said front plate with feeding-spirals and shelling-lips on said jaws, a bearing-ring confined between the shelling-wheel and its front plate whereby the shelling-wheel may be rotated in said ring and a drive-wheel having a beveled gear meshing with the shelling-wheel; substantially as described.

2. In a corn-sheller, the combination with the box having the chute for the cobs, the front board, the shelling-wheel journaled in said front board with means for rotating said wheel and the face-plate with a space between said face-plate and front board, of the chute located in said space and the chaff-chute located between the cob-chute and front board whereby the corn chaff and cobs may be separately discharged from the sheller; substantially as described.

OTIS E. DAVIDSON.

Witnesses:
   THOS. PARKER, Jr.,
   DAVID C. HUGHES.